United States Patent
Okubo

(10) Patent No.: US 9,507,611 B2
(45) Date of Patent: Nov. 29, 2016

(54) ELECTRONIC APPARATUS, CONTROL DEVICE, CONTROL METHOD, AND COMPUTER READABLE MEDIUM

(71) Applicant: FUJI XEROX CO., LTD., Tokyo (JP)

(72) Inventor: Hiroshi Okubo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/828,678

(22) Filed: Aug. 18, 2015

(65) Prior Publication Data

US 2016/0224355 A1    Aug. 4, 2016

(30) Foreign Application Priority Data

Feb. 4, 2015  (JP) .................................. 2015-020391

(51) Int. Cl.
| | | |
|---|---|---|
| G06F 9/44 | (2006.01) | |
| G06F 15/16 | (2006.01) | |
| G06F 1/24 | (2006.01) | |
| G06F 9/445 | (2006.01) | |
| G06F 15/163 | (2006.01) | |

(52) U.S. Cl.
CPC ............ *G06F 9/44505* (2013.01); *G06F 1/24* (2013.01); *G06F 15/163* (2013.01)

(58) Field of Classification Search
CPC ..... G06F 9/44505; G06F 15/163; G06F 1/24
See application file for complete search history.

(56) References Cited

U.S. PATENT DOCUMENTS

| | | | | |
|---|---|---|---|---|
| 5,812,843 A * | 9/1998 | Yamazaki | ........... | G06F 9/45537 709/201 |
| 6,141,697 A * | 10/2000 | Hale | ........... | G06F 9/547 719/312 |
| 6,247,067 B1 * | 6/2001 | Berliner | ........... | G06F 9/45537 719/321 |
| 8,473,968 B2 * | 6/2013 | Su | ........... | G06F 9/45537 719/319 |

FOREIGN PATENT DOCUMENTS

| | | |
|---|---|---|
| JP | 05-210529 A | 8/1993 |
| JP | 2015-005097 A | 1/2015 |

\* cited by examiner

*Primary Examiner* — Stefan Stoynov
(74) *Attorney, Agent, or Firm* — Sughrue Mion, PLLC

(57) ABSTRACT

An electronic apparatus includes a first controller, a second controller, and plural devices. The first controller executes a first operating system. The second controller executes a second operating system. The plural devices are controlled by the second controller. The first controller includes a first conversion unit, a command writing unit, a status reading unit, a second conversion unit, a status disposal unit, and a reset unit. The first conversion unit converts a function which is called by a process into a command. The command writing unit writes the command to a storage region of the second controller. The status reading unit reads a status. The second conversion unit converts the read status into a return value, and returns the return value to the process. The status disposal unit disposes of, for each communication channel, the read status. The reset unit resets, for each communication channel, software and a device.

11 Claims, 8 Drawing Sheets

| COMMAND ID | FLAG | COUNTER |
|---|---|---|
| 1 | OFF | 0 |
| 2 | OFF | 0 |
| 3 | OFF | 0 |
| ⋮ | ⋮ | ⋮ |
| n-2 | OFF | 0 |
| n-1 | OFF | 0 |
| n | OFF | 0 |

54
541 542 543

ELECTRONIC APPARATUS, CONTROL DEVICE, CONTROL METHOD, AND COMPUTER READABLE MEDIUM

CROSS-REFERENCE TO RELATED APPLICATIONS

This application is based on and claims priority under 35 USC 119 from Japanese Patent Application No. 2015-020391 filed Feb. 4, 2015.

BACKGROUND

The present invention relates to an electronic apparatus, a control device, a control method, and a computer readable medium.

SUMMARY

According to an aspect of the invention, there is provided an electronic apparatus including a first controller, a second controller, and plural devices. The first controller executes a first operating system. The second controller executes a second operating system. The plural devices are controlled by the second controller. The first controller includes a first conversion unit that converts a function which is called by a process operating on the first operating system into a command which is to be interpreted in common by the first operating system and the second operating system, a command writing unit that writes the command obtained by the conversion at the first conversion unit to a storage region of the second controller, a status reading unit that reads from the storage region a status which represents a result of execution of a system call of the second operating system by the second controller, the system call corresponding to the command which is written by the command writing unit, a second conversion unit that converts the status which is read by the status reading unit into a return value which is to be interpreted by the process, and returns the return value to the process, a status disposal unit that disposes of, for each communication channel, the status which is read by the status reading unit, in a case where the process is restarted after the writing of the command is performed by the command writing unit, and a reset unit that resets, for each communication channel, software which operates at the second controller that is executing the system call and a device which is controlled by a driver that is called by the system call, in a case where the process is restarted after the writing of the command is performed by the command writing unit.

BRIEF DESCRIPTION OF THE DRAWINGS

Exemplary embodiments of the present invention will be described in detail based on the following figures, wherein.

DETAILED DESCRIPTION

In an exemplary embodiment, a basic configuration such as a so-called multi-processor system which includes two central processing units (CPUs) is provided. Hereinafter, however, a basic software configuration of a single processor system and a basic software configuration of a multi-processor system will be explained. In the explanation provided below, for convenience, a software component is defined as the subject of an operation.

Figure 1:
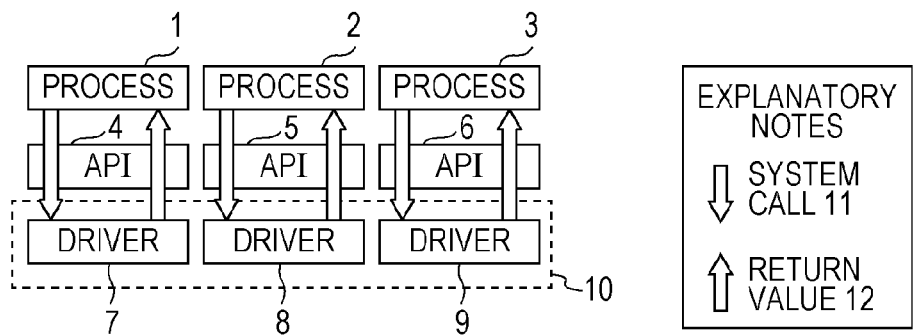
FIG. 1 is a diagram illustrating a basic software configuration of a single processor system.

FIG. 1 is a diagram illustrating a basic software configuration of a single processor system. An operating system (OS) 10 includes drivers 7, 8, and 9 for controlling devices (not illustrated in FIG. 1). Processes 1, 2, and 3 form application programs. The processes 1, 2, and 3 call the drivers 7, 8, and 9 by system calls 11 via application programming interfaces (APIs) 4, 5, and 6, respectively. The called drivers 7, 8, and 9 execute processing corresponding to the content of the system calls 11, and return via the APIs 4, 5, and 6 return values 12 which represent corresponding processing execution results to the processes 1, 2, and 3.

Figure 2:
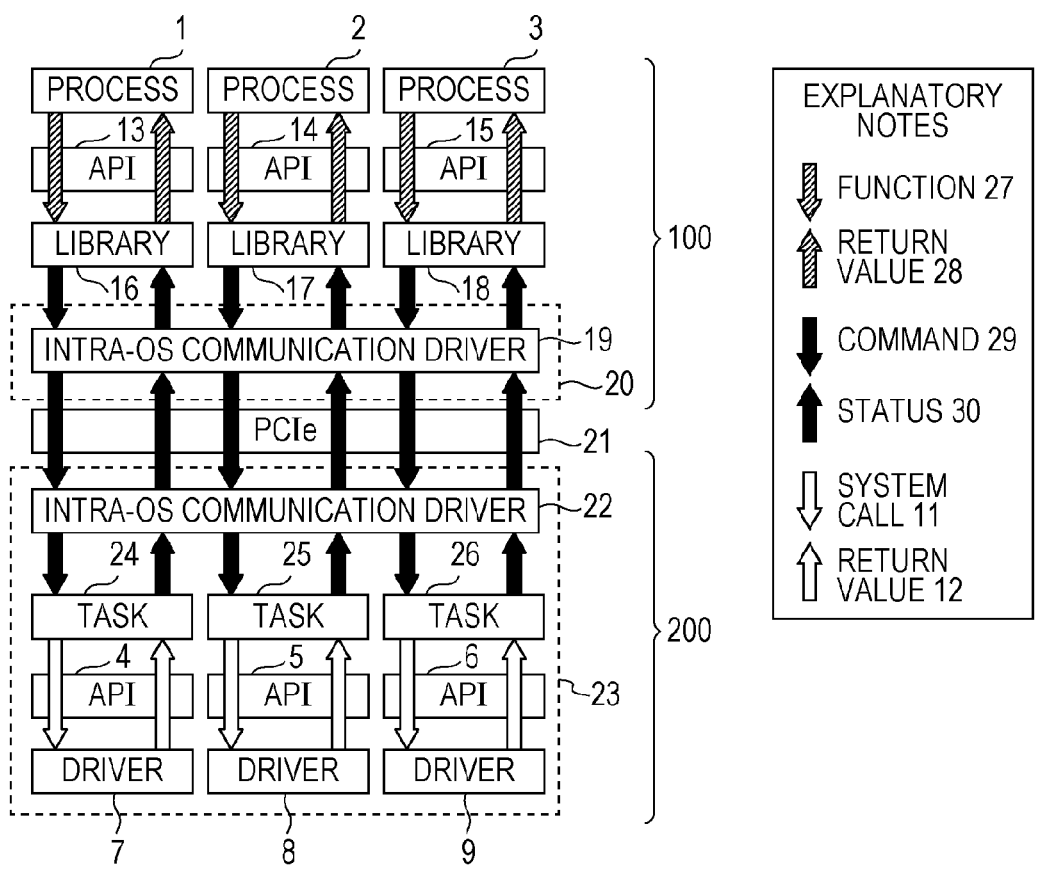
FIG. 2 is a diagram illustrating a basic software configuration of a multi-processor system.

FIG. 2 is a diagram illustrating a basic software configuration of a multi-processor system. The processes 1, 2, and 3 operate on a side of a first controller 100, and the drivers 7, 8, and 9 operate on a side of a second controller 200. Therefore, the processes 1, 2, and 3 execute the system calls 11 via a common library of a first OS 20. Specifically, the system calls 11 which are called via APIs 13, 14, and 15 may be associated in advance with functions 27 which are interpreted by libraries 16, 17, and 18. Alternatively, the processes 1, 2, and 3 may be configured to directly call the functions 27. When the functions 27 are called, in order to deliver the content of the functions 27 to a second OS 23, the libraries 16, 17, and 18 convert the functions 27 into commands 29 which are to be interpreted in common by the first OS 20 and the second OS 23, and deliver the commands 29 to an intra-OS communication diver 19. The intra-OS communication driver 19 transmits the commands 29 to an intra-OS communication driver 22 through intra-OS communication. Any type of interface may be used for the intra-OS communication. In an exemplary embodiment, an example in which peripheral component interconnect express (PCI Express®) (hereinafter, abbreviated as "PCIe") is used will be described.

The intra-OS communication driver 22 delivers the received commands 29 to tasks 24, 25, and 26. Upon receiving the commands 29, the tasks 24, 25, and 26 convert the commands 29 into the system calls 11 which are to be interpreted by the drivers 7, 8, and 9, respectively, and call the drivers 7, 8, and 9 by the system calls 11 via the APIs 4, 5, and 6, respectively. The called drivers 7, 8, and 9 execute processing corresponding to the content of the system calls 11, and return via the APIs 4, 5, and 6 the return values 12 which represent corresponding processing execution results to the tasks 24, 25, and 26.

Upon receiving the return values 12, in order to deliver the content of the return values 12 to the first OS 20, the tasks 24, 25, and 26 convert the return values 12 into statuses 30 which are to be interpreted in common by the first OS 20 and the second OS 23, and deliver the statuses 30 to the intra-OS communication driver 22. The intra-OS communication driver 22 transmits the statuses 30 to the intra-OS communication driver 19 through intra-OS communication. The intra-OS communication driver 19 delivers the received statuses 30 to the libraries 16, 17, and 18. Upon receiving the statuses 30, the libraries 16, 17, and 18 convert the statuses 30 into return values 28 which are to be interpreted by the processes 1, 2, and 3, and return via the APIs 13, 14, and 15 the return values 28 to the processes 1, 2, and 3, respectively. Accordingly, the same processing results as those obtained when the processes 1, 2, and 3 directly call the drivers 7, 8, and 9 in the single processor system may be obtained by the multi-processor system.

Figure 3:
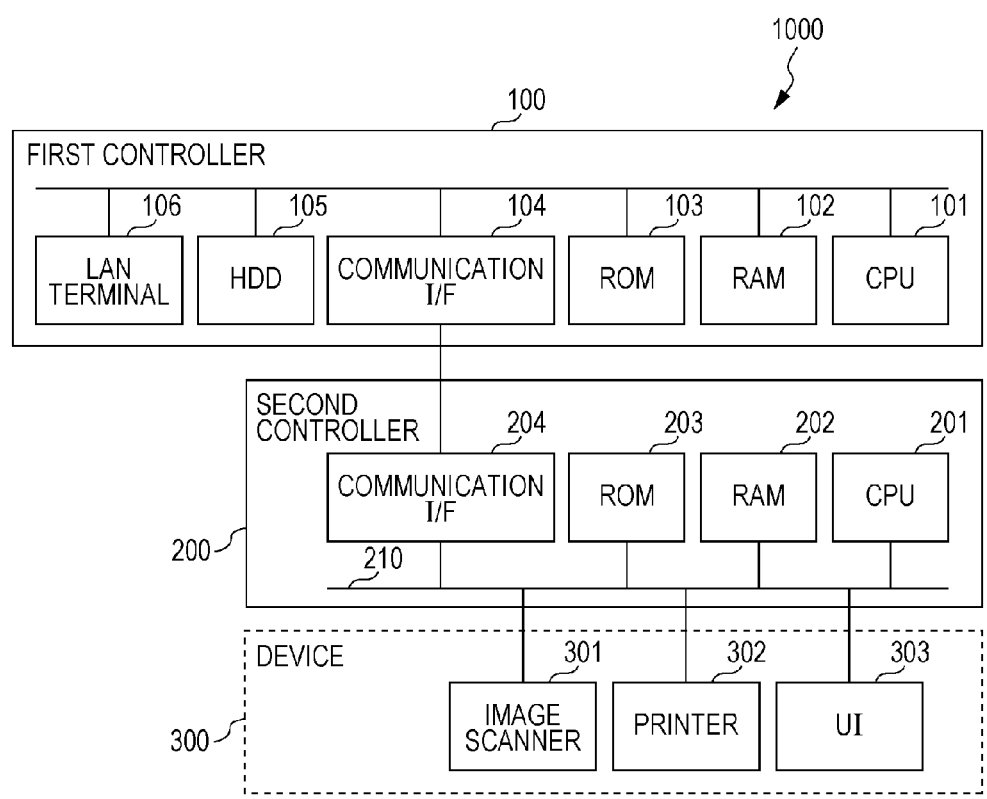
FIG. 3 is a diagram illustrating a hardware configuration according to an exemplary embodiment.
Figure 4:
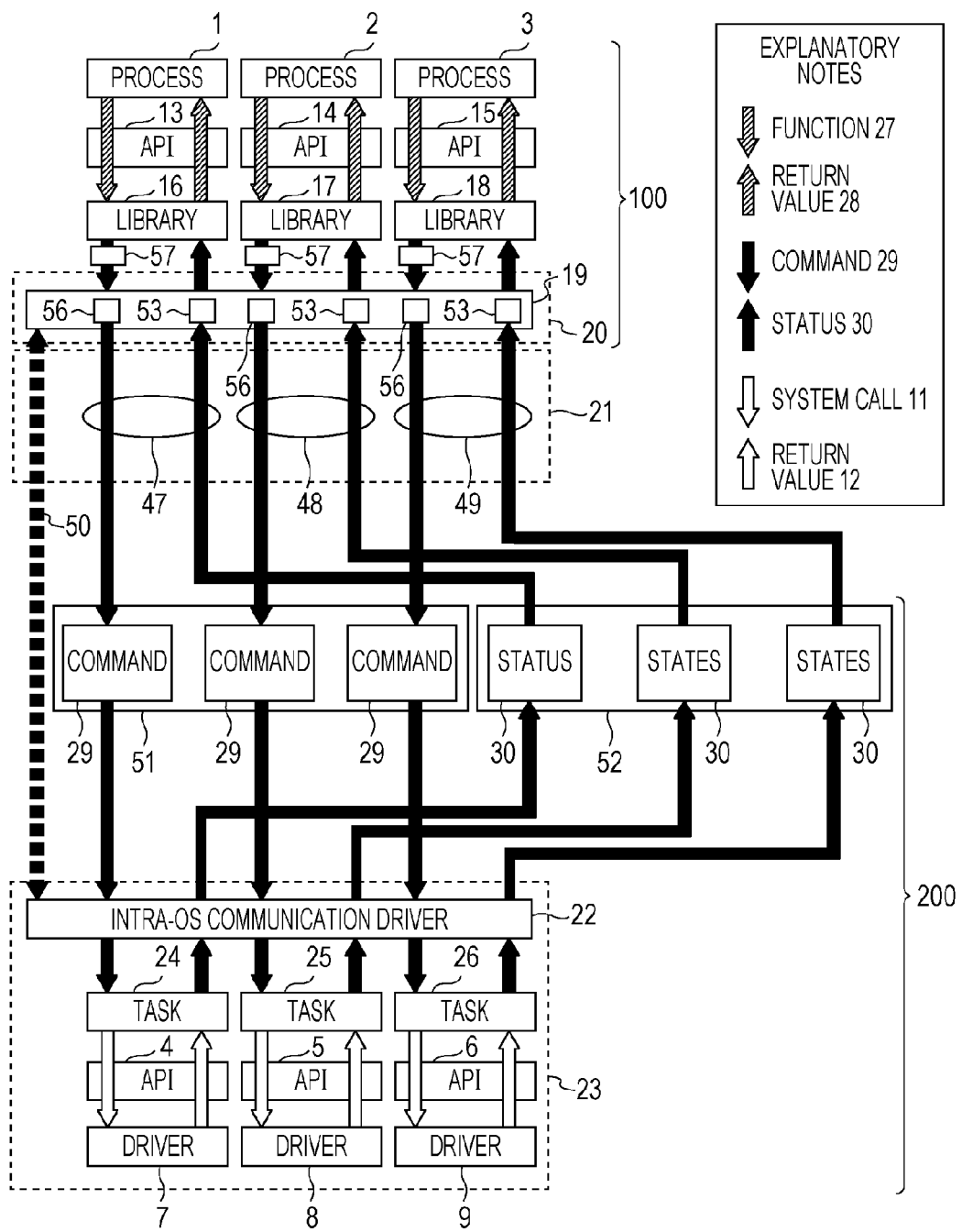
FIG. 4 is a diagram illustrating a software configuration of a multi-processor system according to an exemplary embodiment.

Next, a configuration according to an exemplary embodiment will be explained. FIG. 3 is a diagram illustrating a hardware configuration according to an exemplary embodiment. FIG. 4 is a diagram illustrating a software configuration according to an exemplary embodiment. An image forming apparatus 1000 is an example of an electronic apparatus according to an exemplary embodiment of the present invention. Principal components of the image forming apparatus 1000 are the first controller 100, the second controller 200, and a device 300. The first controller 100 controls the second controller 200. The second controller 200 controls the device 300.

The first controller 100 includes an arithmetic unit such as a CPU 101, storing units such as a random access memory (RAM) 102 and a read only memory (ROM) 103, a communication interface (I/F) 104, an external storing unit such as a hard disk drive (HDD) 105, and a local area network (LAN) terminal 106. These components are connected to a bus 110. The CPU 101 uses the RAM 102 as a work area and executes a program. A boot loader and the like are stored in the ROM 103. The communication I/F 104 is, for example, a PCIe slot, and is connected to a communication I/F 204, which is a PCIe slot provided at the second controller 200, by a signal line. The first OS 20, an application program, and the like are stored in the HDD 105. When the power is supplied to the image forming apparatus 1000, the CPU 101 reads the boot loader from the ROM 103, reads the first OS 20 from the HDD 105, and executes the first OS 20, in accordance with a procedure described in the boot loader. The first OS 20 is, for example, Linux®. A signal line is connected to the LAN terminal 106, and the CPU 101 communicates with an external information processing apparatus and the like via a LAN.

The second controller 200 includes an arithmetic unit such as a CPU 201, storing units such as a RAM 202 and a ROM 203, and the communication I/F 204. These components are connected to a bus 210. The CPU 201 uses the RAM 202 as a work area and executes a program. The second OS 23 is stored in the ROM 203. The CPU 201 reads the second OS 23 from the ROM 203, and executes the second OS 23, in accordance with an instruction from the first controller 100. The second OS 23 is, for example, a real time OS (RTOS), and has a function of a driver which controls the device 300.

The image forming apparatus 1000 includes one or more devices 300. The devices 300 are, for example, an image scanner 301, a printer 302, a user interface (UI) 303, and the like. The number of devices is not particularly limited. The image scanner 301 includes, for example, a light source, an optical system, an imaging element, and the like (not illustrated in FIG. 3). The light source irradiates an original with light, and reflected light which is reflected on the original enters the imaging element through the optical system. Then, the imaging element generates a signal which represents an image of the original, and outputs the signal. The printer 302 includes, for example, a print engine which forms a tone image based on image data, a housing unit which houses a recording medium such as paper, a conveyance mechanism which conveys the recording medium along a transport path, and the like (not illustrated in FIG. 3). The printer 302 prints an image based on the image data supplied from the first controller 100 via the second controller 200 onto the recording medium in an electrophotographic method. The UI 303 includes, for example, a touch panel, a keypad, and the like (not illustrated in FIG. 3), and receives an operation by a user. On the touch panel, a virtual operator to be operated by the user to operate the image forming apparatus 1000, information indicating the status of the image forming apparatus 1000, and the like are displayed. The keypad includes keys to be used for issuing instructions for starting and stopping the operation of the image forming apparatus 1000, ten keys to be used for inputting numbers, and the like.

In an exemplary embodiment, the intra-OS communication driver 19 and the intra-OS communication driver 22 exchange the commands 29 and the statuses 30 via a command buffer 51 and a status buffer 52. A storage region of the RAM 202 may be used as the command buffer 51 and the status buffer 52. Alternatively, by providing a memory which is different from the RAM 202 in the second controller 200, a storage region of the memory may be used as the command buffer 51 and the status buffer 52. The command buffer 51 and the status buffer 52 are, for example, buffers of a first in, first out (FIFO) type, and have a function for notifying the intra-OS communication driver 19 and the intra-OS communication driver 22 of FULL/NOT FULL/EMPTY/NOT EMPTY information, which indicates the status of each storage region, by interrupt 50.

For example, a case in which the process 1 calls the function 27 illustrated below will be explained. In this case, the process 1 is configured to directly call the function 27 of the library 16, and error check for the return value 28 of each function is omitted.

```
int param[4] = [0, 0, 0, 0];
fd = do_open(DRV_1, 0, 0); /* call the first function */
status = do_ioctl(fd, DRV_1_READ_PARAM, ¶m); /* call the second function */
status = do_close(fd); /* call the third function */
```

Figure 5:
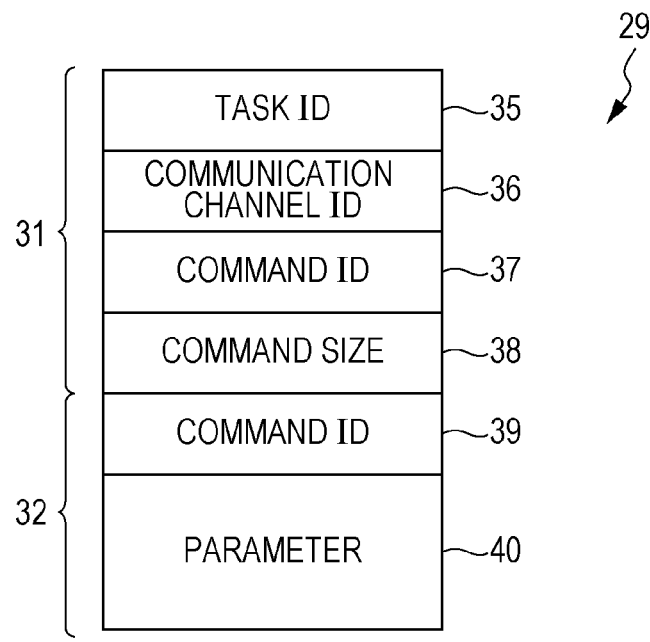
FIG. 5 is a diagram illustrating a format of a command.

FIG. 5 is a diagram illustrating a format of the command 29. The command 29 is information which is to be interpreted in common by the first OS 20 and the second OS 23, and includes a command header 31 and command data 32. When the process 1 calls the function 27, a processing routine of the library 16 which corresponds to the function 27 generates the command data 32. The command data 32 is variable-length data which includes a command identifier (ID) 39 and a parameter 40. The processing routine sets an identifier which indicates the type of the command 29 as the command ID 39, and sets an argument of the function 27 as the parameter 40. The processing routine delivers the thus generated command data 32 to the intra-OS communication driver 19.

Here, the third argument of the function do_ioctl( ), which is the second-called function in the above function call example, serves as a pointer which indicates the logical address of a storage region. However, in the case where the logical address of the first controller 100 differs from the logical address of the second controller 200, even if the pointer is directly delivered to the second controller 200, the second controller 200 is not able to access the storage region which is indicated by the pointer. Therefore, in generation of the command data 32, the processing routine sets, as the parameter 40, a storage region (4 bytes×4=16 bytes) which is indicated by the pointer, instead of the value of the pointer. In the above example, the region which is indicated by the pointer is initialized to 0, and the storage region set for the parameter 40 is also initialized to 0.

Upon receiving the command data 32, the intra-OS communication driver 19 generates the command header 31, which is information necessary for intra-OS communication with the intra-OS communication driver 22. The command header 31 includes a task ID 35, a communication channel ID 36, a command ID 37, and a command size 38. The intra-OS communication driver 19 sets, as the task ID 35, an identifier of the task 24 on the side of the second OS 23 which interprets the command data 32, sets, as the communication channel ID 36, an identifier of a communication channel 47 for intra-OS communication, sets, as the command ID 37, a set value of the command ID 39 of the command data 32, and sets, as the command size 38, the size of the command data 32. The intra-OS communication driver 19 combines the command header 31 generated as described above with the command data 32 to generate the command 29, and writes the generated command 29 into the command buffer 51 through intra-OS communication. Then, the intra-OS communication driver 19 notifies the intra-OS communication driver 22 of NOT EMPTY by the interrupt 50.

Upon receiving the notification of NOT EMPTY, the intra-OS communication driver 22 reads the command 29 from the command buffer 51, and determines a task for processing the command 29, based on the task ID 35 of the command header 31. In this example, the task 24 is the task for processing the command 29, and therefore the intra-OS communication driver 22 delivers the command 29 to the task 24. The intra-OS communication driver 22 repeats delivery of the command 29 to the task 24 until the command buffer 51 becomes empty. When the command buffer 51 becomes empty, the intra-OS communication driver 22 waits for being notified of NOT EMPTY by the intra-OS communication driver 19.

Upon receiving the command 29, the task 24 converts the command data 32 into the system call 11 to be interpreted by the driver 7, and calls the driver 7 via the API 4. Here, as described above, the parameter 40 which corresponds to do_ioctl( ) in the above function call example is not a pointer which indicates a logical address but is a storage region (4 bytes×4=16 bytes) which is indicated by the pointer. Therefore, the task 24 secures the storage region on the memory of the second controller 200, initializes the secured storage region, and sets the pointer of the storage region as the third argument of the system call 11. The driver 7 executes the system call 11, and returns the return value 12 which represents the execution result to the task 24. The task 24 generates the status 30, based on the return value 12.

Figure 6:
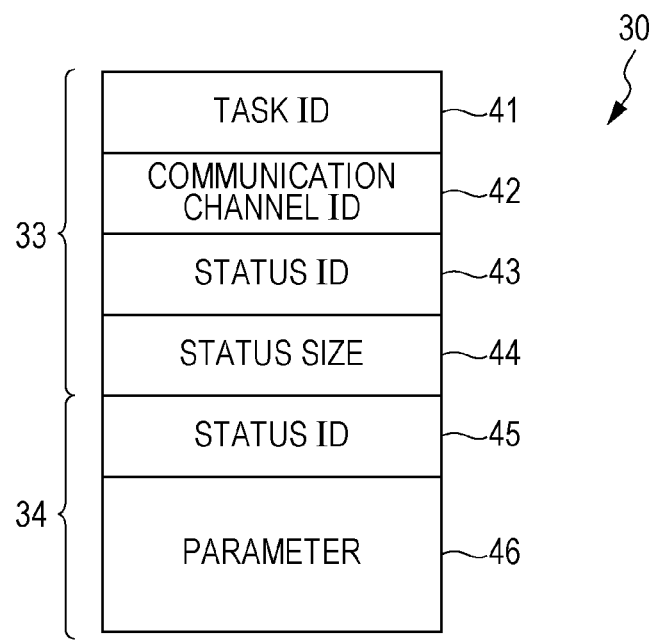
FIG. 6 is a diagram illustrating a format of a status.

FIG. 6 is a diagram illustrating a format of the status 30. The status 30 is information which is to be interpreted in common by the first OS 20 and the second OS 23, and includes a status header 33 and status data 34. The status data 34 is variable-length data which includes a status ID 45 and a parameter 46. The task 24 sets, as the status ID 45, an identifier which indicates the type of the status corresponding to the system call 11. Here, the task 24 sets the status ID 45 in such a manner that the command ID 39 corresponding to the status ID 45 may be obtained by masking the most significant bit of the status ID 45 to 1. The task 24 sets the return value 12 which is received from the driver 7 for the parameter 46. Here, when the return value 12 indicates successful completion, data is written in the storage region which is indicated by the pointer set for the third argument of the system call 11 corresponding to the second function do_ioctl( ) in the above function call example. Therefore, the task 24 sets the data, as well as the return value 12, for the parameter 46.

The status header 33 includes a task ID 41, a communication channel ID 42, a status ID 43, and a status size 44. The task 24 sets, as the task ID 41, a set value of the task ID 35, which is set for the command 29, and sets, as the communication channel ID 42, a set value of the communication channel ID 36, which is set for the command 29. The task 24 sets, as the status ID 43, a set value of the status ID 45 of the status data 34, and sets, as the status size 44, the size of the status data 34. The task 24 delivers the thus generated status 30 to the intra-OS communication driver 22. Upon receiving the status 30, the intra-OS communication driver 22 writes the status 30 into the status buffer 52. Then, the intra-OS communication driver 22 notifies the intra-OS communication driver 19 of NOT EMPTY by the interrupt 50.

Upon receiving the notification of NOT EMPTY, the intra-OS communication driver 19 reads the status 30 from the status buffer 52 through intra-OS communication, and determines the library which processes the status data 34, based on the communication channel ID 42 of the status header 33. In this example, since the library 16 is the library that processes the status data 34, the intra-OS communication driver 19 delivers the status 30 to the library 16. The intra-OS communication driver 19 repeats the delivery of the status 30 to the library 16 until the status buffer 52 becomes empty. When the status buffer 52 becomes empty, the intra-OS communication driver 19 waits for being notified of NOT EMPTY by the intra-OS communication driver 22.

Upon receiving the status 30, the library 16 converts the status data 34 into the return value 28 to be interpreted by the process 1, and returns the return value 28 to the process 1. Here, data, as well as information to be converted into the return value 28, is set for the status data 34 which corresponds to the second function do_ioctl( ) in the above function call example. Therefore, the library 16 writes the data to the address which is specified by the third argument of do_ioctl( ).

<Status Disposal Function>

Next, a status disposal function will be described. In the case where abnormal termination of any process occurs after the command 29 is written to the command buffer 51, the problem described below may occur. For example, a case where abnormal termination of the process 1 occurs will be explained below. The function 27 which is called by the process 1 before the abnormal termination is converted into the command 29 by the library 16. The command 29 is written to the command buffer 51, and the intra-OS communication driver 22 is notified of NOT EMPTY. After that, the second controller 200 continues to operate even after the abnormal termination of the process 1. Therefore, the command 29 read from the command buffer 51 is converted into the system call 11, the driver 7 performs processing in accordance with the system call 11, and the status 30 which represents the execution result is generated and written to the status buffer 52. However, processing by the library 16 is also terminated when the abnormal termination of the process 1 occurs. Therefore, a read method is not performed for the communication channel 47, and the status 30 is not read from the status buffer 52.

When the process 1 which has been subjected to abnormal termination is restarted, the library 16 corresponding to the process 1 performs an open method for the communication channel 47. The first command 29 after the restart is generated, and the generated command 29 is written to the command buffer 51. Then, the status 30 which represents the execution result of the command 29 is written to the status buffer 52, and the intra-OS communication driver 19 is notified of NOT EMPTY. However, since the status 30 which represents the execution result of the command 29 which is written to the command buffer 51 before the abnormal termination of the process 1 remains in the status buffer 52, a difference may occur in the correspondence between the command 29 and the status 30 when the status 30 is read by the intra-OS communication driver 19. Therefore, the multi-processor system may perform false operation. In an exemplary embodiment, the status disposal function explained below is provided at the first OS 20. A status disposal unit 53 which implements the status disposal function is provided at the intra-OS communication driver 19 for each communication channel, and processing by the status disposal unit 53 is performed for each communication channel.

Figures 7, 8:
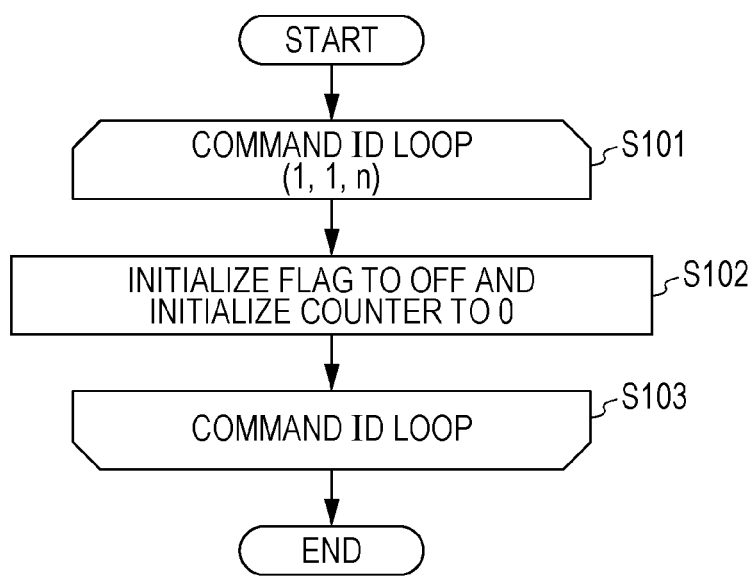
FIG. 7 is a diagram illustrating a table.
FIG. 8 is a flowchart of an initialization process for a status disposal function.

FIG. 7 is a diagram illustrating a table 54. The status disposal unit 53 generates the table 54 for each communication channel, and the generated table 54 is stored in the RAM 102 or the HDD 105. The table 54 is a table in which a command ID 541, a flag 542, and a counter 543 are in association with each other. The command ID 541 is an identifier which indicates the type of the command 29, and is the same as the command ID 39 and the command ID 37. In this example, the command 29 includes n types. Serial numbers from 1 to n are assigned to the command ID 541. The flag 542 is a flag which indicates, for each command ID 541, whether or not the status 30 indicating the execution result of the command 29 corresponding to the command ID 541 is valid. When the flag 542 indicates ON, the status 30 is valid. When the flag 542 indicates OFF, the status 30 is invalid. Switching between ON and OFF of the flag 542 will be described below. The counter 543 indicates a value obtained, for each command ID 541, by subtracting the number of times the status 30 corresponding to the command ID 541 is read from the status buffer 52 from the number of times the command 29 corresponding to the command ID 541 is written to the command buffer 51.

FIG. 8 is a flowchart of an initialization process for the status disposal function. The status disposal unit 53 is provided at the intra-OS communication driver 19, and an initialization process for the status disposal function is therefore included in an initialization process for the intra-OS communication driver 19. Thus, the initialization process for the status disposal function is executed every time the first OS 20 is restarted.

In step S101, the status disposal unit 53 adds 1 to a loop counter (initial value=0).

In step S102, the status disposal unit 53 initializes the flag 542, which corresponds to the command ID 541 corresponding to the value of the loop counter, to OFF, and initializes the counter 543, which corresponds to the command ID 541, to 0.

In step S103, the status disposal unit 53 determines whether or not the loop counter has reached n. When the loop counter has not reached n, the process returns to step S101. When the loop counter has reached n, the process ends.

Figure 9:
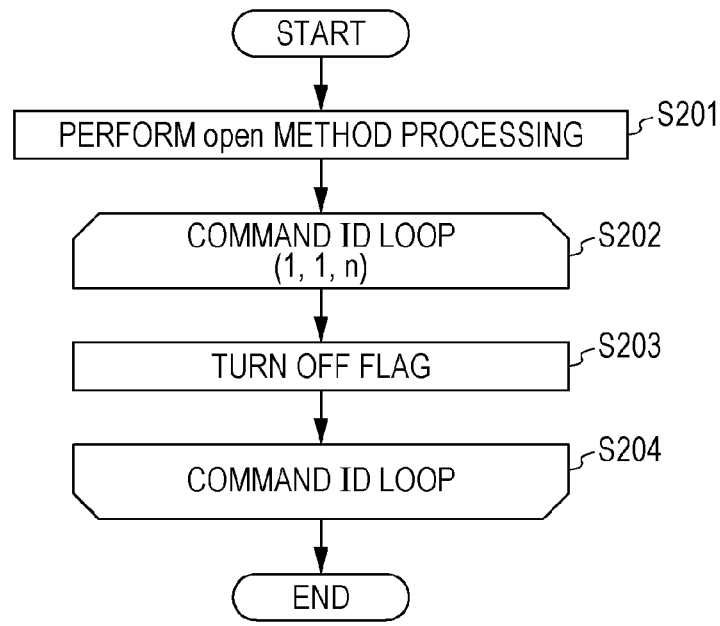
FIG. 9 is a flowchart of a process for the status disposal function in an open method.

FIG. 9 is a flowchart of a process for the status disposal function in an open method of the intra-OS communication driver 19. The process described below is performed for each communication channel. For example, the case of the communication channel 47 will be explained below.

In step S201, the process 1 calls the library 16, and the library 16 performs open method processing for the communication channel 47. Then, as a return value of the open method processing, a file descriptor which indicates the communication channel 47 is returned to the library 16. After this, the communication channel 47 which is to be processed is identified by the file descriptor.

In step S202, the status disposal unit 53 adds 1 to the loop counter (initial value=0).

In step S203, the status disposal unit 53 turns OFF the flag 542 which corresponds to the command ID 541 corresponding to the value of the loop counter.

In step S204, the status disposal unit 53 determines whether or not the loop counter has reached n. When the loop counter has not reached n, the process returns to step S201. When the loop counter has reached n, the process ends.

The process illustrated in FIG. 9 may be performed subsequent to the initialization process for the status disposal function (FIG. 8) or may be performed subsequent to the restart of the process 1 after abnormal termination. In the former case, the flag 542 is already initialized to OFF in the process illustrated in FIG. 8, and therefore the flag 542 remains OFF even after the process illustrated in FIG. 9 is performed. In contrast, in the latter case, a flag which is turned ON before the abnormal termination is rewritten to OFF in the process illustrated in FIG. 9.

Figure 10:
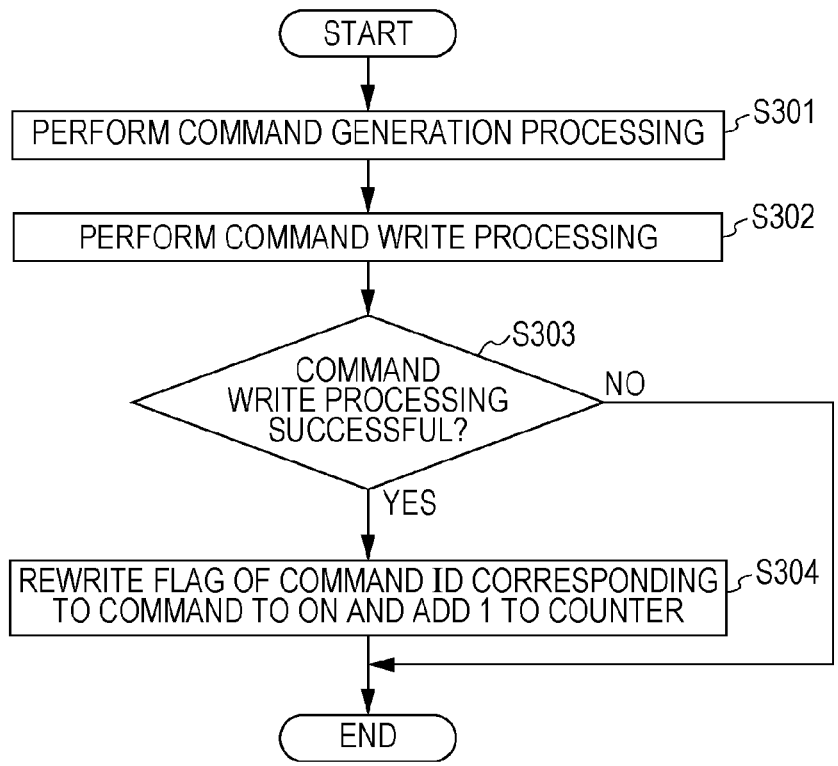
FIG. 10 is a flowchart of a process for the status disposal function in a write method.

FIG. 10 is a flowchart of a process for the status disposal function in a write method of the intra-OS communication driver 19.

In step S301, the library 16 and the intra-OS communication driver 19 generate the command 29. Specifically, a processing routine of the library 16 which corresponds to the function 27 generates the command data 32, and delivers the command data 32 to the intra-OS communication driver 19. Upon receiving the command data 32, the intra-OS communication driver 19 generates the command header 31, and combines the generated command header 31 with the command data 32 to generate the command 29.

In step S302, the intra-OS communication driver 19 writes the generated command 29 to the command buffer 51 through intra-OS communication.

In step S303, the status disposal unit 53 determines whether or not writing of the command 29 in step S302 is successful. When the writing is successful (step S303; YES), the process of the status disposal unit 53 proceeds to step S304. When the writing is not successful (step S303; NO), the process ends.

In step S304, the status disposal unit 53 rewrites the flag 542, which corresponds to the command ID 541 included in the command 29 written in the command buffer 51 in step S302, to ON, and adds 1 to the counter 543 which corresponds to the command ID 541. Then, the process ends.

In short, when the writing of the command 29 to the command buffer 51 is successful, the flag 542 which corresponds to the command ID 541 of the command 29 is rewritten to ON, and adds 1 to the counter 543. In contrast, when the writing of the command 29 to the command buffer 51 is not successful, the flag 542 which corresponds to the command ID 541 of the command 29 remains OFF, and no addition is performed at the counter 543. Furthermore, in the case where after the writing of the command 29 to the command buffer 51 is successfully completed, the process 1 is subjected to abnormal termination and is then restarted, the flag which is turned ON before the abnormal termination is rewritten to OFF in the process illustrate in FIG. 9.

Figure 11:
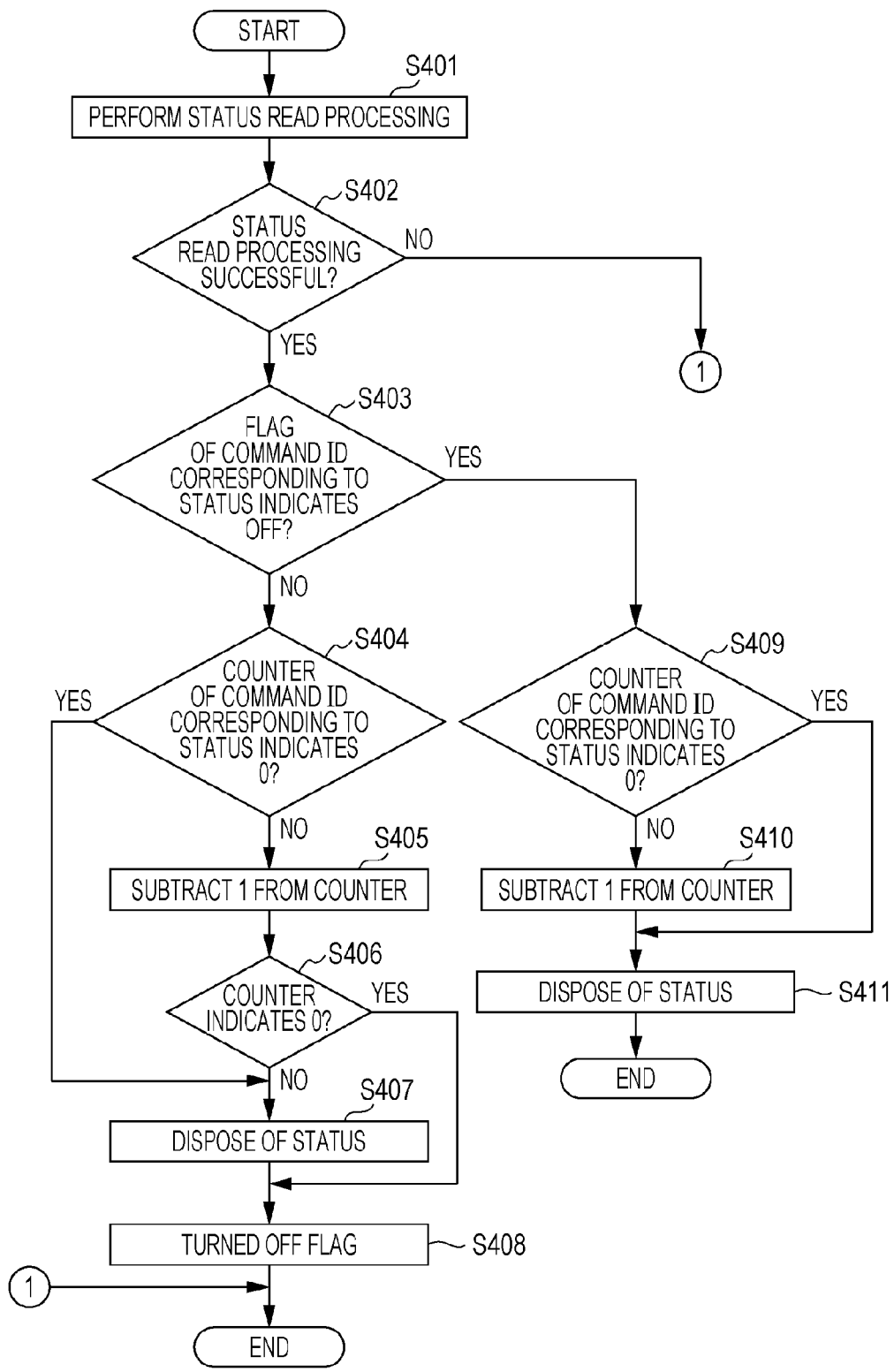
FIG. 11 is a flowchart of a process for the status disposal function in a real method.

FIG. 11 is a flowchart of a process for the status disposal function in a read method of the intra-OS communication driver 19.

In step S401, the status disposal unit 53 reads the status 30 from the status buffer 52 through intra-OS communication. Specifically, the intra-OS communication driver 19 waits for being notified of NOT EMPTY by the intra-OS communication driver 22. Upon receiving the notification of NOT EMPTY, the intra-OS communication driver 19 reads the status 30 from the status buffer 52 through intra-OS communication.

In step S402, the status disposal unit 53 determines whether or not the reading of the status 30 in step S401 is successful. When the reading is successful (step S402; YES), the process of the status disposal unit 53 proceeds to step S403. When the reading is not successful (step S402; NO), the status disposal unit 53 ends the process.

In step S403, the status disposal unit 53 determines whether or not the flag 542 which corresponds to the command ID 541 of the command 29 corresponding to the status 30 read in step S401 indicates OFF. Here, the command ID 541 which corresponds to the status ID 45 is obtained by masking the most significant bit of the status ID 45 included in the status 30 to 1. When the flag 542 which corresponds to the command ID 541 does not indicate OFF (step S403; NO), the process of the status disposal unit 53 proceeds to step S404. When the flag 542 indicates OFF (step S403; YES), the process of the status disposal unit 53 proceeds to step S409.

In step S404, the status disposal unit 53 determines whether or not the counter 543 which corresponds to the command ID 541 of the command 29 corresponding to the status 30 read in step S401 indicates 0. When the counter 543 does not indicate 0 (step S404; NO), the process of the status disposal unit 53 proceeds to step S405. When the counter 543 indicates 0 (step S404; YES), the process of the status disposal unit 53 proceeds to step S407.

In step S405, the status disposal unit 53 subtracts 1 from the counter 543 which corresponds to the command ID 541 of the command 29 corresponding to the status 30 read in step S401.

In step S406, the status disposal unit 53 determines whether or not the value of the counter 543 obtained by subtraction of 1 in step S405 is 0. When the value of the counter 543 is not 0 (step S406; NO), the process of the status disposal unit 53 proceeds to step S407. When the value of the status disposal unit 53 is 0 (step S406; YES), the process of the status disposal unit 53 proceeds to step S408.

In step S407, the status disposal unit 53 disposes of the status 30 read in step S401.

In step S408, the status disposal unit 53 rewrites the flag 542 which corresponds to the command ID 541 of the command 29 corresponding to the status 30 read in step S401 to OFF. Then, the process ends.

In step S409, the status disposal unit 53 determines whether or not the counter 543 which corresponds to command ID 541 of the command 29 corresponding to the status 30 read in step S401 indicates 0. When the counter 543 does not indicate 0 (step S409; NO), the process of the status disposal unit 53 proceeds to step S410. When the counter 543 indicates 0 (step S409; YES), the process of the status disposal unit 53 proceeds to step S411.

In step S410, the status disposal unit 53 subtracts 1 from the counter 543 of the command ID 541 which corresponds to the status 30 read in step S401.

In step S411, the status disposal unit 53 disposes of the status 30 read in step S401. Then, the process ends.

The processing of step S403 and later will be described as follows:

(1) Case where the Flag Indicates ON and the Counter Indicates 1 (Step S403; NO, Step S404; NO, Step S406; YES)

Since the status 30 read from the status buffer 52 corresponds to the processing result of the command 29 which is written to the command buffer 51, the status disposal unit 53 does not dispose of the read status 30. The status 30 is converted into the return value 28 by the library 16, and is returned to the process 1. Furthermore, since the status 30 is read from the status buffer 52, the status disposal unit 53 subtracts 1 from the counter 543 which corresponds to the command ID 541 of the command 29 corresponding to the status 30 (step S405). Furthermore, since the command 29 which corresponds to the status 30 is already processed, the status disposal unit 53 rewrites the flag 542 which corresponds to the command ID 541 to OFF (step S408).

(2) Case where the Flag Indicates ON and the Counter does not Indicate 0 or 1 (Step S403; N, Step S404; NO, Step S405; NO)

Since the status 30 read from the status buffer 52 does not correspond to the processing result of the command 29 which is written to the command buffer 51, the status disposal unit 53 disposes of the read status 30 (step S407). Furthermore, since the status 30 is read from the status buffer 52, the status disposal unit 53 subtracts 1 from the counter 543 which corresponds to the command ID 541 of the command 29 corresponding to the status 30 (step S405). Furthermore, since the command 29 which corresponds to the status 30 is already processed, the status disposal unit 53 rewrites the flag 542 which corresponds to the command ID 541 to OFF (step S408). The state in which the counter does not indicate 0 or 1 indicates that a failure has occurs in the multi-processor system.

(3) Case where the Flag Indicates ON and the Counter Indicates 0 (Step S403; NO, Step S404; YES)

Since the status 30 read from the status buffer 52 does not correspond to the processing result of the command 29 written to the command buffer 51, the status disposal unit 53 disposes of the read status 30 (step S407). Since the counter 543 which corresponds to the command ID 541 of the command 29 corresponding to the status 30 indicates 0, subtraction is not performed at the counter 543. Furthermore, since the command 29 which corresponds to the status 30 is already processed, the status disposal unit 53 rewrites the flag 542 which corresponds to the command ID 541 to OFF (step S408). The state in which the counter indicates 0 indicates that a failure has occurred in the multi-processor system.

(4) Case where the Flag Indicates OFF and the Counter does not Indicate 0 (Step S403; YES, Step S409; NO)

When the process 1 which has been subjected to abnormal termination is restarted, the flags which correspond to all the command IDs are rewritten to OFF in the process illustrated in FIG. 9. That is, the state in which the flag 542 indicates OFF in step S403 indicates that after the command 29 which corresponds to the command ID 541 of the flag 542 is written to the command buffer 51, the process 1 is subjected to abnormal termination and is then restarted. Therefore, the status disposal unit 53 subtracts 1 from the counter 543 (step S410), and disposes of the status 30 read from the status buffer 52 (step S411).

(5) Case where the Flag Indicates OFF and the Counter Indicates 0 (Step S403; YES, Step S409; YES)

Similar to case (4), since the process 1 is restarted after abnormal termination, the status disposal unit 53 disposes of the read status 30 (step S411). However, since the counter 543 indicates 0, subtraction is not performed at the counter 543. The state in which the counter indicates 0 indicates that a failure has occurred in the multi-processor system.

Among cases (1) and (5) described above, case (1) represents the case where abnormal termination of the process 1, a failure in the multi-processor system, or the like does not occur during the period from completion of writing of the command 29 to the command buffer 51 to reading of the status 30. In contrast, in cases (2) and (3), a failure occurs in the multi-processor system. In addition, in cases (4) and (5), abnormal termination of the process 1 occurs after the command 29 is written to the command buffer 51, and then the process 1 is restarted. In case (1), the status 30 is not disposed of but is converted into the return value 28 and returned to the process 1. In the other cases, the status 30 is disposed of.

In cases (4) and (5) described above, the state of the task 24, the driver 7, or the device controlled by the driver 7 and the state of the process 1 may not match. Therefore, a reset function 57 which is prepared for each communication channel of the application program of the first controller 100 performs a reset operation illustrated in FIG. 12 so that the task 24, the driver 7, and the device controlled by the driver 7 may be restarted. The reset function 57 issues a command for restarting the task 24, the driver 7, the device controlled by the driver 7.

Figure 12:
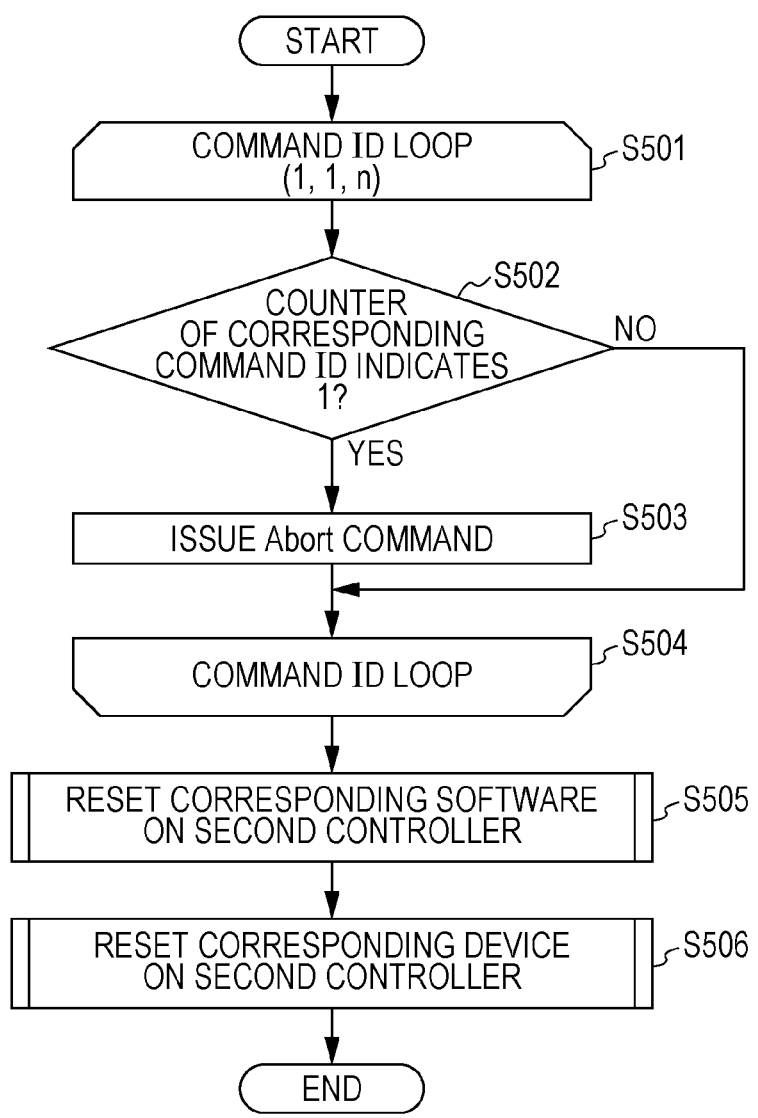
FIG. 12 is a flowchart illustrating a reset operation.

FIG. 12 is a flowchart illustrating a reset operation.

In step S501, the reset function 57 adds 1 to the loop counter (initial value=0).

In step S502, the reset function 57 determines whether or not the counter 543 which corresponds to the command ID 541 of the command 29 corresponding to the status 30 read by the status disposal unit 53 in step S401 of FIG. 11 indicates 1. When the counter 543 indicates 1 (step S502; YES), the command of the corresponding command ID is being processed and the process of the reset function 57 thus proceeds to step S503. When the counter 543 does not indicate 1 (step S502; NO), the command of the corresponding command ID is not being processed and the process of the reset function 57 thus proceeds to step S504 without performing the processing of step S503.

In step S503, the reset function 57 issues an Abort command to the command that is identified as being processed.

In step S504, the reset function 57 determines whether or not the loop counter has reached n. When the loop counter has not reached n, the process returns to step S501. When the loop counter has reached n, the process ends.

The Abort command issued in step S503 is written to the command buffer 51 through intra-OS communication. Then, the intra-OS communication driver 19 notifies the intra-OS communication driver 22 of NOT EMPTY by the interrupt 50.

Upon receiving the notification of NOT EMPTY, the intra-OS communication driver 22 reads the command 29, which is an Abort command, from the command buffer 51, and delivers the command 29 to the task 24, based on the task ID 35 of the command header 31.

Upon receiving the command 29, which is an Abort command, the task 24 stops the command that is being processed.

Next, in step S505, the second OS 23 resets software (application) which corresponds to the task 24 for a communication channel which has received the Abort command, from among software that is being executed on the second controller 200.

Next, in step S506, the second OS 23 resets the driver 7 and the device controlled by the driver 7 for a communication channel which has received the Abort command, from among the drivers that are being executed on the second controller 200.

According to this exemplary embodiment, in the case where after the command 29 is written to the command buffer 51, the process 1 is subjected to abnormal termination and is then restarted, the status 30 which represents the execution result of the command 29 which is written to the command buffer 51 before the abnormal termination is disposed of, and the task 24 that is processing the command 29 and the device that is controlled by the driver 7 are reset. Therefore, not only the process 1 that has been subjected to abnormal termination but the communication channel including the task 24 and the driver 7 and the device that is controlled by the driver 7 may also be reset. Moreover, the other communication channels and the devices that are controlled by the drivers for the other communication channels may be operated without being reset.

In the case where after the command 29 is written to the command buffer 51, the process 1 is subjected to abnormal termination and is then restarted, the status 30 representing the execution result of the command 29 which is written to the command buffer 51 before the abnormal termination is disposed of. Therefore, no difference occurs in the correspondence between the command 29 and the status 30 after the process 1 which has been subjected to abnormal termination is restarted. Furthermore, according to this exemplary embodiment, when a failure has occurred in the multi-processor, the read status 30 is disposed of. Therefore, no difference occurs in the correspondence between the command 29 and the status 30.

Even if abnormal termination of the process 1 does not occur, the above-mentioned reset function may be applied. For example, when a failure occurs in the task 24, the driver 7, or the device that is controlled by the driver 7, the reset function 57 may be executed as described above, and the command 29 for which processing is not completed due to the occurrence of the failure may be written again to the command buffer 51.

That is, if the reset function 57 is executed when a failure has occurred in the task 24, the driver 7, or the device that is controlled by the driver 7, allocation of a file descriptor to the communication channel 47 is lost. Therefore, when the reset function 57 is executed, an open command is required to be executed again. However, since the process 1 does not recognize that the allocation of the file descriptor to the communication channel 47 has been lost, the process 1 calls the function 27 without executing the open command. Furthermore, due to the execution of the reset function 57, the system call 11 that is ready for processing by the driver 7 is also lost. Therefore, not only the open command but an ioctl command (asynchronous command) is also required to be executed again. Thus, a command rewriting function is provided at the first OS 20. A command rewriting unit 56 that implements the command rewriting function is provided at the intra-OS communication driver 19 for each communication channel. Processing by the command rewriting unit 56 is performed for each communication channel.

Specifically, in the case where the command 29 which is generated and written to the command buffer 51 is an open command, the command 29 is held in a written open command holding region. In the case where the command 29 is an asynchronous command, the command 29 is held in a written command holding region. In the case where the command 29 is neither an open command nor an asynchronous command, the command 29 is held in neither the written open command holding region nor the written command holding region.

A difference between a synchronous command and an asynchronous command will be explained below. In the case of a synchronous command, the process 1 does not call the next function 27 until the return value 28 for the called function 27 is returned. Furthermore, switching from a normal mode to a power-saving mode is not performed until the return value 28 is returned. In contrast, in the case of the asynchronous command, the process 1 is allowed to call another function 27 before the return value 28 for the called function 27 is returned.

In the case where the reset function 57 is executed after the command 29 is written to the command buffer 51, the command 29 which is held in the written open command holding region is rewritten to the command buffer 51. Therefore, the system call which is lost by the execution of the reset function 57 is executed again after being reset.

Modifications

In the foregoing exemplary embodiment, an example in which the present invention is applied to the image forming apparatus 1000 which includes the image scanner 301, the printer 302, and the UI 303 as the device 300 is explained. However, the device 300 is not limited to the above. Furthermore, the number of devices 300 is not limited.

In the foregoing exemplary embodiment, a case where Linux is used as an example of the first OS 20 and an RTOS is used as an example of the second OS 23 is explained. However, the first OS 20 and the second OS 23 may be other types of OS.

In the foregoing exemplary embodiment, an example in which the image forming apparatus 1000 includes the first controller 100, the second controller 200, and the device 300 is explained. However, by connecting a control device which has a function of the first controller 100 and an image forming apparatus which has functions of the second controller 200 and the device 300 through a communication unit, functions similar to those in the foregoing exemplary embodiment may be implemented. Furthermore, a program for implementing the function of the first controller 100 may be recorded on a computer-readable recording medium such as an optical recording medium or a semiconductor memory and provided. Furthermore, the program may be provided via an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
   a first controller that executes a first operating system;
   a second controller that executes a second operating system; and
   a plurality of devices that are controlled by the second controller,
   wherein the first controller includes
      a first conversion unit that converts a function which is called by a process operating on the first operating system into a command which is to be interpreted in common by the first operating system and the second operating system,
      a command writing unit that writes the command obtained by the conversion at the first conversion unit to a storage region of the second controller,
      a status reading unit that reads from the storage region a status which represents a result of execution of a system call of the second operating system by the second controller, the system call corresponding to the command which is written by the command writing unit,
      a second conversion unit that converts the status which is read by the status reading unit into a return value which is to be interpreted by the process, and returns the return value to the process,
      a status disposal unit that disposes of, for each communication channel, the status which is read by the status reading unit, in a case where the process is restarted after the writing of the command is performed by the command writing unit, and
      a reset unit that resets, for each communication channel, software which operates at the second controller that is executing the system call and a device which is controlled by a driver that is called by the system call, in a case where the process is restarted after the writing of the command is performed by the command writing unit.

2. The electronic apparatus according to claim 1, wherein in a case where the second controller is executing a system call of the second operating system, the reset unit interrupts the system call of the second operating system, and then resets, for each communication channel, the software which operates at the second controller that is executing the system call and the device which is controlled by the driver that is called by the system call.

3. The electronic apparatus according to claim 1,
   wherein the reset unit is software of the first operating system which operates at the first controller, is provided for each communication channel, and resets, by issuing a reset command, the software which operates at the second controller that is executing the system call and the device which is controlled by the driver that is called by the system call.

4. The electronic apparatus according to claim 2,
   wherein the reset unit is software of the first operating system which operates at the first controller, is provided for each communication channel, and resets, by issuing a reset command, the software which operates at the second controller that is executing the system call and the device which is controlled by the driver that is called by the system call.

5. An electronic apparatus comprising:
a first controller that executes a first operating system;
a second controller that executes a second operating system; and
a plurality of devices that are controlled by the second controller,
wherein the first controller includes
a first conversion unit that converts a function which is called by a process operating on the first operating system into a command which is to be interpreted in common by the first operating system and the second operating system,
a command writing unit that writes the command obtained by the conversion at the first conversion unit to a storage region of the second controller,
a status reading unit that reads from the storage region a status which represents a result of execution of a system call of the second operating system by the second controller, the system call corresponding to the command which is written by the command writing unit,
a second conversion unit that converts the status which is read by the status reading unit into a return value which is to be interpreted by the process, and returns the return value to the process,
a reset unit that resets, for each communication channel, software which operates at the second controller that is executing the system call and a device which is controlled by a driver that is called by the system call, and
a command rewriting unit that rewrites, for the communication channel for which the resetting is performed, the command which corresponds to the system call of the second operating system that has been executed by the second controller to the storage region of the second controller.

6. A control device comprising:
a first conversion unit that converts a function which is called by a process operating on a first operating system into a command which is to be interpreted in common by the first operating system and a second operating system which is executed by a second controller;
a command writing unit that writes the command obtained by the conversion at the first conversion unit to a storage region of the second controller;
a status reading unit that reads from the storage region a status which represents a result of execution of a system call of the second operating system by the second controller, the system call corresponding to the command which is written by the command writing unit;
a second conversion unit that converts the status which is read by the status reading unit into a return value which is to be interpreted by the process, and returns the return value to the process;
a status disposal unit that disposes of, for each communication channel, the status which is read by the status reading unit, in a case where the process is restarted after the writing of the command is performed by the command writing unit; and
a reset unit that resets, for each communication channel, software which operates at the second controller that is executing the system call and a device which is controlled by a driver that is called by the system call, in a case where the process is restarted after the writing of the command is performed by the command writing unit.

7. A control device comprising:
a first conversion unit that converts a function which is called by a process operating on a first operating system into a command which is to be interpreted in common by the first operating system and a second operating system which is executed by a second controller;
a command writing unit that writes the command obtained by the conversion at the first conversion unit to a storage region of the second controller;
a status reading unit that reads from the storage region a status which represents a result of execution of a system call of the second operating system by the second controller, the system call corresponding to the command which is written by the command writing unit;
a second conversion unit that converts the status which is read by the status reading unit into a return value which is to be interpreted by the process, and returns the return value to the process;
a reset unit that resets, for each communication channel, software which operates at the second controller that is executing the system call and a device which is controlled by a driver that is called by the system call; and
a command rewriting unit that rewrites, for the communication channel for which the resetting is performed, the command which corresponds to the system call of the second operating system that has been executed by the second controller to the storage region of the second controller.

8. A control method comprising:
converting a function which is called by a process operating on a first operating system into a command which is to be interpreted in common by the first operating system and a second operating system;
writing the command obtained by the conversion to a storage region;
reading from the storage region a status which represents a result of execution of a system call of the second operating system, the system call corresponding to the written command;
converting the read status into a return value which is to be interpreted by the process, and returns the return value to the process;
disposing of, for each communication channel, the read status, in a case where the process is restarted after the writing of the command is performed; and
resetting, for each communication channel, software and a device, in a case where the process is restarted after the writing of the command is performed.

9. A control method comprising:
converting a function which is called by a process operating on a first operating system into a command which is to be interpreted in common by the first operating system and a second operating system;
writing the command obtained by the conversion to a storage region;
reading from the storage region a status which represents a result of execution of a system call of the second operating system, the system call corresponding to the written command;
converting the read status into a return value which is to be interpreted by the process, and returns the return value to the process;
resetting, for each communication channel, software and a device; and
rewriting, for the communication channel for which the resetting is performed, the command which corresponds to the system call of the second operating system to the storage region.

10. A non-transitory computer readable medium storing a program causing a computer to execute a process for control, the process comprising:
  converting a function which is called by a process operating on a first operating system into a command which is to be interpreted in common by the first operating system and a second operating system;
  writing the command obtained by the conversion to a storage region;
  reading from the storage region a status which represents a result of execution of a system call of the second operating system, the system call corresponding to the written command;
  converting the read status into a return value which is to be interpreted by the process, and returns the return value to the process;
  disposing of, for each communication channel, the read status, in a case where the process is restarted after the writing of the command is performed; and
  resetting, for each communication channel, software and a device, in a case where the process is restarted after the writing of the command is performed.

11. A non-transitory computer readable medium storing a program causing a computer to execute a process for control, the process comprising:
  converting a function which is called by a process operating on a first operating system into a command which is to be interpreted in common by the first operating system and a second operating system;
  writing the command obtained by the conversion to a storage region;
  reading from the storage region a status which represents a result of execution of a system call of the second operating system, the system call corresponding to the written command;
  converting the read status into a return value which is to be interpreted by the process, and returns the return value to the process;
  resetting, for each communication channel, software and a device; and
  rewriting, for the communication channel for which the resetting is performed, the command which corresponds to the system call of the second operating system to the storage region.

* * * * *